United States Patent
Dufresne

(10) Patent No.: US 10,843,854 B2
(45) Date of Patent: Nov. 24, 2020

(54) TECHNIQUES FOR MAKING AND USING HOLDING STRAPS WITH HOOK-AND-STRAP ATTACHMENT

(71) Applicant: PULTRUSION TECHNIQUE INC., St-Bruno (CA)

(72) Inventor: Robert P. Dufresne, Saint-Bruno (CA)

(73) Assignee: PULTRUSION TECHNIQUE INC., St-Bruno (CA)

( * ) Notice: Subject to any disclaimer, the term of this patent is extended or adjusted under 35 U.S.C. 154(b) by 123 days.

(21) Appl. No.: 15/768,426

(22) PCT Filed: Oct. 12, 2016

(86) PCT No.: PCT/CA2016/051189
§ 371 (c)(1),
(2) Date: Apr. 13, 2018

(87) PCT Pub. No.: WO2017/063081
PCT Pub. Date: Apr. 20, 2017

(65) Prior Publication Data
US 2018/0305097 A1 Oct. 25, 2018

Related U.S. Application Data

(60) Provisional application No. 62/240,910, filed on Oct. 13, 2015.

(51) Int. Cl.
*B65D 63/10* (2006.01)
*B29C 70/30* (2006.01)
(Continued)

(52) U.S. Cl.
CPC ............ *B65D 63/10* (2013.01); *B29B 15/105* (2013.01); *B29C 70/30* (2013.01); *B60P 7/0823* (2013.01);
(Continued)

(58) Field of Classification Search
CPC ........ B65D 63/10; B60P 7/0823; B29C 70/30; B29B 15/105; B66C 1/18; B66C 1/14;
(Continued)

(56) References Cited

U.S. PATENT DOCUMENTS 3,660,887 A * 5/1972 Davis .................. B29C 39/10
264/262
3,668,740 A 6/1972 Pearson
(Continued)

FOREIGN PATENT DOCUMENTS

| CA | 2438352 A1 | 8/2002 |
| CA | 2854824 A1 | 5/2013 |
| WO | WO-2015067178 A1 | 5/2015 |

OTHER PUBLICATIONS

English translation of WO-2015067178 retrieved from Google Patents on Jun. 14, 2020.*
(Continued)

*Primary Examiner* — Robert Sandy
*Assistant Examiner* — Louis A Mercado
(74) *Attorney, Agent, or Firm* — Marshall, Gerstein & Borun LLP

(57) ABSTRACT

There are provided a holding strap, methods of making the same, and methods using such holding strap for tying down objects on a flatbed of a vehicle, retaining underground tanks, or lifting electrodes out of an electrolytic cell. The holding strap includes a chemically pre-treated strap component, an epoxy resin chemically bonded to the pre-treated strap component, and a hook component comprising a cavity that is configured and sized to receive at least a portion of the strap component, the epoxy resin being chemically bonded to internal surfaces of the cavity, so as to form the holding strap.

14 Claims, 2 Drawing Sheets

(51) Int. Cl.
    *B29B 15/10*   (2006.01)
    *B66C 1/18*    (2006.01)
    *B66C 1/14*    (2006.01)
    *B60P 7/08*    (2006.01)
    *B29L 31/00*       (2006.01)
    *C09J 163/00*      (2006.01)

(52) U.S. Cl.
    CPC ................. *B66C 1/14* (2013.01); *B66C 1/18* (2013.01); *B29L 2031/7276* (2013.01); *C09J 163/00* (2013.01)

(58) Field of Classification Search
    CPC ............. B29L 2031/7276; C09J 163/00; C09J 2467/008; C09J 2467/006; C09J 2400/163; C09J 2400/263; C09J 2400/266; C09J 2433/00; C09J 5/02
    See application file for complete search history.

(56) References Cited

U.S. PATENT DOCUMENTS

| | | | | |
|---|---|---|---|---|
| 4,008,669 | A | * | 2/1977 | Sumrell .................... B60P 7/12 410/47 |
| 4,417,953 | A | * | 11/1983 | Viellefont ................. C25C 7/08 205/76 |
| 2014/0291471 | A1 | * | 10/2014 | Dufresne ................ F16B 45/02 248/499 |
| 2016/0298002 | A1 | | 10/2016 | Dai et al. |

OTHER PUBLICATIONS

International Search Report for International Application No. PCT/CA2016/051189, dated Dec. 21, 2016.
Written Opinion of the International Searching Authority for International Application No. PCT/CA2016/051189, dated Dec. 21, 2016.

* cited by examiner

TECHNIQUES FOR MAKING AND USING HOLDING STRAPS WITH HOOK-AND-STRAP ATTACHMENT

CROSS-REFERENCE TO RELATED APPLICATION

The present application is the US national phase of International Application No. PCT/CA2016/051189, filed Oct. 12, 2016, which claims priority to U.S. Provisional Application No. 62/240,910, filed Oct. 13, 2015. The priority application, U.S. 62/240,910, is hereby incorporated by reference.

TECHNICAL FIELD

The technical field generally relates to holding straps that include a strap component and a hook component, methods of making the same, and methods using such holding straps for retaining or lifting objects.

BACKGROUND

There are various types of holding straps that can be used in certain applications in order to retain or lift an object in a certain position or against a surface. For instance, hold-down straps can be used for holding down an underground tank, and such hold-down straps include a strap component and a hook component attached to either end of the strap component for hooking onto concrete base elements which are typically located on either side of the tank. In addition, tie-down straps can be used for tying down a load on the flatbed of a truck. There are other examples of holding straps in other fields used for retaining or lifting various objects.

There are some known methods of attaching a hook component to a strap component to form a holding strap. For example, there are some crimping methods (e.g., using a crimping tool) that are used for this attachment, as well as stitching or sewing methods.

There are various disadvantages with some of the known holding straps as well as the use of such straps and the methodologies for attaching the strap component to the hook component.

SUMMARY

The present invention responds to the above need by providing a holding strap and related processes, methods and uses.

In some implementations, there is provided a holding strap comprising: a strap component comprising a connection end that has been chemically pre-treated with a pre-treatment agent; an epoxy resin chemically bonded to the pre-treated connection end of the strap component; and a hook component composed of a metallic material comprising a hook element and a base element integrally formed with the hook element, the base element comprising a cavity that is configured and sized to receive at least a portion of the connection end of the strap component, the epoxy resin being chemically bonded to internal surfaces of the cavity.

In some implementations, there is provided a process for producing a holding strap, comprising: pre-treating a strap component, comprising contacting a pre-treatment agent with a connection end of the strap component, the strap component being composed of a polymer material; chemically bonding pre-treated connection end of the strap component to an epoxy resin; and chemically bonding the epoxy resin within a cavity of a hook component, thereby chemically bonding the hook component to the strap component.

In some implementations, there is provided a method of tying down objects on a flatbed of a vehicle, comprising using the holding strap as defined herein and/or produced by the process as defined herein.

In some implementations, there is provided a method of holding down an underground tank, comprising using the holding strap as defined herein and/or produced by the process as defined herein.

In some implementations, there is provided a method of lifting a cathode out of an electrolytic cell, comprising using the holding strap as defined herein and/or produced by the process as defined herein.

In some implementations, there is provided a use of the holding strap as defined herein and/or produced by the process as defined herein for tying down objects on a flatbed of a vehicle.

In some implementations, there is provided a use of the holding strap as defined herein and/or produced by the process as defined herein for holding down an underground tank.

In some implementations, there is provided a use of the holding strap as defined herein and/or produced by the process as defined herein for lifting a cathode out of an electrolytic cell.

In some implementations, one or more steps and/or features as described in the specification and/or drawings are used in combination with the above holding strap, process, method and/or use.

In some implementations, the pre-treatment agent comprises a coupling agent and/or an adhesive. In some implementations, the coupling agent comprises a silane-based compound. In some implementations, the epoxy resin comprises a bisphenol A or bisphenol F based compound.

In some implementations, the strap component comprises polyester fibers that are pre-treated. In some implementations, the strap component consists of polyester fibers that are pre-treated.

In some implementations, the cavity of the hook component is coated with wax prior to providing the epoxy resin therein. In some implementations, the cavity has a dovetail configuration.

The objects, advantages and other features of the present implementations will become more apparent and be better understood upon reading of the following non-restrictive description of the implementations, given with reference to the accompanying drawings.

BRIEF DESCRIPTION OF THE DRAWINGS

Implementations in relation to the holding strap are represented in and will be further understood in connection with the following figures.

DETAILED DESCRIPTION

In some implementations, holding straps can be produced by pre-treating a connection end of a strap component, and then chemically bonding the pre-treated connection end of the strap component within a cavity defined in part of a hook component. The holding straps can be used in various applications, notably as hold-down straps for underground tanks, tie-down straps for flatbeds, or cathode-lifting straps in hydrometallurgical operations.

Figure 1:
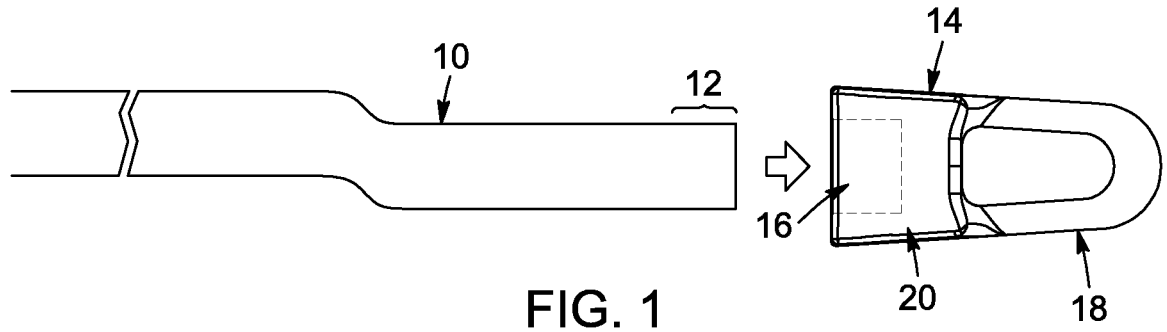
FIG. 1 a side view schematic of a strap component and a hook component.
Figure 2:
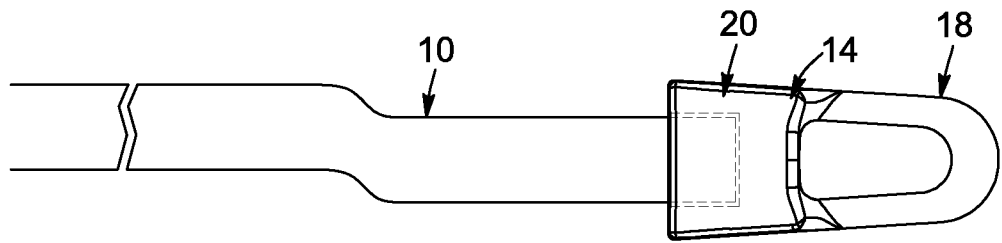
FIG. 2 is a side view schematic of a holding strap.
Figure 3:
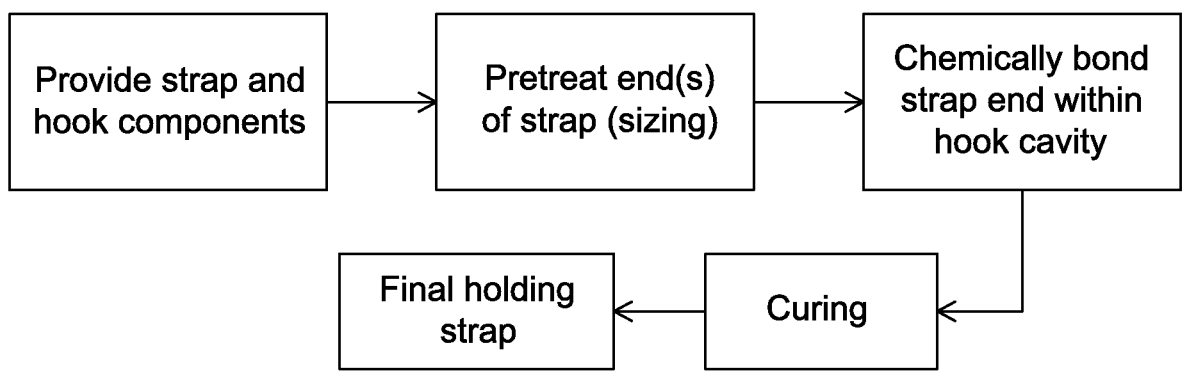
FIG. 3 is a process diagram.

Referring to FIGS. 1 and 2, a strap component (10) is provided having at least one extremity (12), also referred to as connection end, although the strap component (10) preferably has two opposed extremities that are substantially similar to each other. A hook component (14) includes a cavity (16) that is configured to accommodate the connection end (12) of the strap component (10). In some implementations, the connection end (12) is pre-treated by using a chemical pre-treatment technique and the chemical bonding is facilitated by an epoxy compound which is provided in between the cavity (16) of the hook (14) and the pre-treated connection end (12) of the strap in order to provide covalent bonding.

The strap component (10) can include, for example, polyester and/or nylon polymer fibers or threads that can be arranged in a certain weave or pattern. Various examples of strap components can be obtained from Belt-Tech™ and may have one or more properties as further described below. The polymer threads of the strap component (10) may be arranged such that there are external threads, as well as internal threads surrounded by external threads. In such a scenario, the pre-treatment step of the connection end (12) can be conducted such that both the external and internal threads of the strap component (10) are treated, contacted and/or impregnated with the pre-treatment chemical solution. The external threads may be more easily accessed by the solution, and the internal threads may be accessed by the pre-treatment solution, by various means, including providing cuts or slits within the connection end (12) of the strap component (10) and/or by employing vacuum or compressed air or pressure vessels, allowing sufficient time for impregnation of the solution through the external threads in order to access the internal threads.

The hook component (14) is preferably composed of a metallic material that is compatible for chemical bonding with the corresponding chemical that is used to create the bond between the pre-treated connection end (12) and the cavity surfaces of the hook component (14). For example, the hook component (14) can be composed of cast iron, other iron-based metals, steel, or stainless steel in some implementations. Depending on the final application of holding strap, the hook component (14) can be composed of various other materials designed or selected to have certain properties such as corrosion resistance, insulation, conductivity, and so on.

It should be noted that the hook component (14) can have various configurations in terms of the hook mechanism (18) that attaches a support structure as well as the base (20) that includes the cavity (16). The hook mechanism (18) can be integrally formed with the base element (20). The hook mechanism (18) can include an integrally closed hook, as illustrated in FIGS. 1, 2, 4 and 5, or can be a hook where the opening is accessible by a moving part. The hook mechanism can be a closed D-type hook or an open C-type hook, depending on the application.

Figure 4:
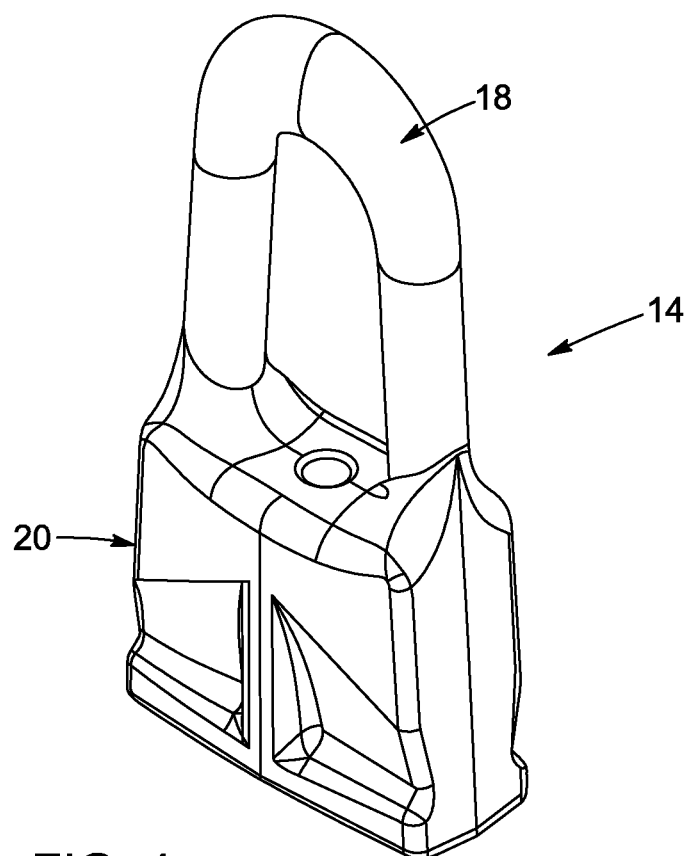
FIG. 4 is a perspective view of a hook component.
Figure 5:
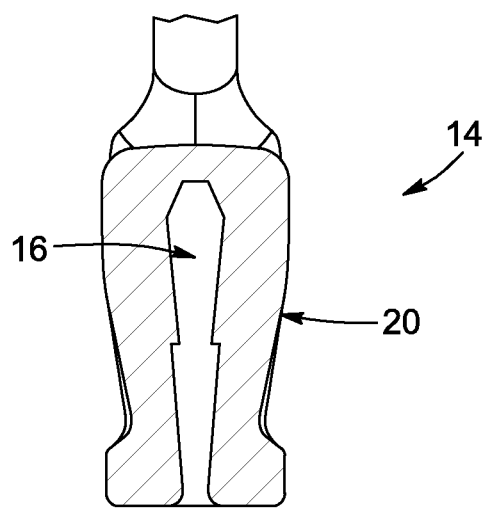
FIG. 5 is a side cut view of part of a hook component.

Referring to FIGS. 4 and 5, the hook component (14) can have a certain form and configuration. In some implementations, the cavity (16) has a dovetail shape in cross-section (see FIG. 5) while having a rectangular cross-section in the other direction (not illustrated). The dovetail configuration can facilitate the connection with the strap component. The dovetail cavity (16) can be sized such that the narrower sections correspond with the thickness of the strap component, or are slightly smaller than the thickness to allow insertion as well as pinching from opposed sides. In some implementations, the dovetail cavity is treated with wax before insertion of the strap component. The dovetail shape of the cavity may serve as a counter-sink mechanism. In some implementations, the cavity (16) of the hook component (14) has a depth of at least two inches, and the pre-treatment of the connection end (12) of the strap component is done over a corresponding length from the tip of the connection end, such that a substantially corresponding length of the connection end is pre-treated to facilitate maximum bonding with the epoxy-treated cavity (16).

In some implementations, the fibers/threads of the strap component (10) can have a certain weave pattern such that the pre-treatment chemical solution can easily impregnate the threads of the connection end (12) over a sufficient length to enable the chemical bonding to happen over the appropriate desired length that is inserted into the cavity (16). In other words, by contacting the tip of the connection end (12) with the pre-treatment solution, the solution can impregnate a certain distance along the strap component (10) that generally corresponds to the depth of the cavity (16), and may also include an additional length safety factor. It should also be noted that the strap component (10) may have fiber- and thread-arrangements to have sufficient strength (preferably for the desired application of holding down or lifting), but also to have sufficient void space between the threads and/or fibers to enable efficient and rapid diffusion and impregnation of the pre-treatment solution therein. In some implementations, the impregnation of the pre-treatment solution is facilitated by providing a connection technique that ensures that the whole threads of the strap have reacted with the pre-treatment agents to hold the strap inside the cavity. It should be noted that the connection technique should be selected and implemented so as to not detrimentally impact the strength properties of the strap component, depending on the desired end-use of the holding strap.

In some implementations, the pre-treatment agent is applied as a solution or liquid. In some implementations, the pre-treatment agent comprises a coupling agent, which may be silane-based and may have the following general formula $(CH_3O)_3-Si-CH_2-CH_2-CH_2-NR-CH_2-CH_2-N-R_2$, where R can be hydrogen or a benzyl chloride group, for example. One example of a silane coupling agent is Xiameter™ OFS-6032 Silane, which may be combined with a solvent such as methanol. Other coupling agents with dual reactivity can also be used, and may be selected depending on the materials of the other compounds and components in the holding strap. The coupling agent can have a first functional group with reactivity selected based on the properties of the strap component material(s), such as polyester for example, and a second functional group with reactivity selected based on the properties of the epoxy resin. In some implementations, the pre-treatment agent comprises what can be referred to as a "sizing" compound.

In some implementations, the pre-treatment agent comprises an adhesive, such as Chemlok™, in order to provide the bonding between the epoxy resin and the strap component material(s). In some scenarios, an adhesive and a coupling agent can be mixed either before or during application onto the strap component depending on compatibility.

The epoxy resin is preferably liquid upon application and can be bisphenol A based, bisphenol F based, novolac epoxy, or other types of epoxy resins. In some implementations, the epoxy resin is applied as the adherent to create the bond between the hook component (14) and the pre-treated connection end (12). It should be noted that the pre-treatment solution and the epoxy resin are provided in order to be compatible with each other and with the materials of the hook component and the strap component. The chemicals chosen for the pre-treatment (e.g., coupling compound, sizing, adhesive) and the bonding agent (e.g. the resin adherent such as epoxy resins) with the hook component, may also be chosen to provide improved stability and resistance to degradation in the given end-use. For example, for underground tank hold-down straps where there may be underground bacteria increasing the risk of biologically and/or chemically degrading stitched fibers of thread that may be used in known techniques, the chemical nature of the compounds between the hook and the strap component have enhanced stability in terms of resistance to bacteria. In addition, the chemical bonds are located within the cavity which further provides a physical barrier against external wear- or damage-causing elements.

As other examples, the adherent (e.g., epoxy resin) used when the end-use is in corrosive applications (e.g., in hydrometallurgical refinery where sulfuric acid is prevalent), should be selected accordingly. For example, in such corrosive applications bisphenol A epoxy may be avoided and another epoxy resin could be preferred. Thus, one should choose the proper adherent for the desired application.

In some implementations, the epoxy is injected into the cavity (16) and then the pretreated connection end (12) of the strap component (10) is inserted, after which sufficient time is provided to enable the chemical reactions and bonding to occur. The pretreatment preferably includes providing the adequate pressure and temperature conditions to promote good bonding and reaction for a solid connection between the components.

The chemically-bonded holding strap, and example schematic of which is shown in FIG. 2, can be used in various applications, such as hold-down straps for underground tanks, tie-down straps for loading vehicles, or lifting straps for lifting cathode components or other hydrometallurgical equipment used in electrolytic refining cells. Other applications, such as seatbelts, are possible.

For hold-down straps for underground tanks, the strap component can be 3 or 4 inches wide, for example, to provide the desired strength and the hook component can be designed to engage the underground base. For applications in hydrometallurgy, for lifting cathodes or cathode sections for example, the strap can be wider (e.g., to provide sufficient strength to 24,000 kg, rough estimation), and hook component can be designed to engage with the support structure that is used to lift a cathode load. Due to the very high current involved (e.g., 20,000, 30,000, 40,000 or 60,000 Amps), typical methods for lifting cathodes includes the use of metal cables as well as highly electrically insulated associated equipment and building structures. In some implementations, the strap component is composed of an insulating material and is sized and configured for lifting cathodes out of an active electrolysis cell (i.e., out of the electrolyte). The straps can connected to an overhead crane that is used to enable the lifting while being electrically insulated from the overhead crane metallic components. In some implementations, the hook component is configured to engage with a rack that engages one or more cathodes, such racks being typically 3 to 9 meters long and 1.5 meters wide. The overhead crane can overhang above an array of many electrolytic cells with hundreds of electrodes, and the plated cathodes must be periodically removed. The strap enables engagement (hooking) with the rack, and can then be lifted via the overhead crane so as to lift the rack and cathode out of the electrolytic cell.

It should be understood that any one of the above mentioned optional aspects of each strap, process, method and use of a holding strap may be combined with any other of the aspects thereof, unless two aspects clearly cannot be combined due to their mutually exclusivity. For example, the various optional operational steps and/or structural elements of the process/method and strap described herein-above, herein-below and/or in the appended Figures, may be combined with any of the general holding strap, process, method, or use descriptions appearing herein and/or in accordance with the appended claims.

EXAMPLES

The following example was conducted with strap component from a Belt-Tech™ (pattern 5778; 100% polyester; width 51 mm; warp ends 450; binder ends 46; warp 3300 dtex polyester; filling 1100 dtex polyester; catchcord 1100 dtex polyester; 51 mm width no load according to FMVSS 209 test method; 4.2 picks per cm according to ASTM D-3775 test method; 20,850 lbs original tensile according to FMVSS 209; and 15.5 warp direction pliability according to ASTM-1388 test method). The epoxy that was used was obtained from Dow D.E.R. 331 (i.e., a widely used, general-purpose liquid epoxy resin based on bisphenol A, generally recognized as a standard from which many variations have been developed) or D.E.R. 332 (i.e., a high purity diglycidyl ether of bisphenol A, having high purity and low oligomer content assuring uniform performance, exceptionally low viscosity and can provide improved elevated temperature properties over standard epoxy resins, the resin grade being mainly used in filament winding, electrical laminates and encapsulation applications). The hook component was composed of cast iron 80-55-06. The pretreatment chemicals comprised a coupling compound which was Xiameter OFS-6032 Silane from Dow Corning. The wax may be the liquid flour wax Acrylic finish 2080 from Choisy. It was found that the chemical bonding between the connection ends of the strap component and each corresponding hook component was substantially strong such that such straps may be used in various applications.

The invention claimed is:

1. A holding strap comprising:
a strap component comprising a connection end that has been chemically pre-treated with a pre-treatment agent to produce a pre-treated connection end;
an epoxy resin chemically bonded to the pre-treated connection end of the strap component via chemical bonding between the pre-treatment agent and the epoxy resin; and
a hook component composed of a metallic material comprising a hook element and a base element integrally formed with the hook element, the base element comprising a cavity which is pre-coated with wax and is configured and sized to receive at least a portion of the pre-treated connection end of the strap component, the epoxy resin being further chemically bonded to internal surfaces of the cavity.

2. The holding strap of claim 1, wherein the pre-treatment agent comprises at least one of a coupling agent and an adhesive.

3. The holding strap of claim 2, wherein the coupling agent comprises a silane-based compound.

4. The holding strap of claim 1, wherein the epoxy resin comprises a bisphenol A or bisphenol F based compound.

5. The holding strap of claim 1, wherein the strap component comprises or consists of polyester fibers.

6. The holding strap of claim 1, wherein the cavity has a dovetail geometry.

7. The holding strap of claim 6, wherein the dovetail geometry of the cavity comprises narrow sections having at most a thickness of the strap component to allow insertion thereof as well as pinching thereof from opposed sides of the cavity.

8. The holding strap of claim 1, wherein the pre-treatment agent and the epoxy resin are selected to enhance stability of the chemical bonding under bacterial or corrosive environment.

9. A process for producing a holding strap, comprising:
pre-treating a strap component, comprising contacting a pre-treatment agent with a connection end of the strap component, the strap component being composed of a polymer material;
chemically bonding the pre-treated connection end of the strap component to an epoxy resin;
pre-treating a hook component that comprises a hook element and a base element integrally formed with the hook element, the base element comprising a cavity that is configured and sized to receive at least a portion of the connection end of the strap component, the pre-treating of the hook component comprising coating the cavity with wax; and
chemically bonding the epoxy resin within the cavity of the base element of the hook component, thereby chemically bonding the hook component to the strap component.

10. The process of claim 9, wherein the pre-treating of the strap component comprises contacting the connection end with a pre-treatment solution including the pre-treatment agent.

11. The process of claim 10, wherein the pre-treating of the strap component comprises impregnating a distance along the connection end of the strap component with the pre-treatment solution, the distance at least corresponding to a depth of the cavity.

12. The process of claim 10, wherein the pre-treating of the strap component comprises impregnating each thread or fiber of the strap component with the pre-treatment solution to ensure that every threads or fibers of the strap component are held within the cavity after chemical bonding thereof.

13. The process of claim 9, wherein the cavity has a dovetail geometry comprising narrow sections having at most a thickness of the strap component to allow insertion of the connection end as well as pinching thereof from opposed sides of the cavity.

14. The process of claim 13, comprising selecting the pre-treatment agent and the epoxy resin to enhance stability of the chemical bonding under bacterial or corrosive environment.

* * * * *